(12) United States Patent
Ishida et al.

(10) Patent No.: US 11,180,123 B2
(45) Date of Patent: Nov. 23, 2021

(54) VEHICLE CONTROL SYSTEM

(71) Applicant: ADVICS CO., LTD., Kariya (JP)

(72) Inventors: Yasuhito Ishida, Toyokawa (JP); Takayuki Yamamoto, Nagakute (JP)

(73) Assignee: ADVICS CO., LTD., Kariya (JP)

( * ) Notice: Subject to any disclaimer, the term of this patent is extended or adjusted under 35 U.S.C. 154(b) by 174 days.

(21) Appl. No.: 16/476,702

(22) PCT Filed: Jan. 10, 2018

(86) PCT No.: PCT/JP2018/000366
§ 371 (c)(1),
(2) Date: Jul. 9, 2019

(87) PCT Pub. No.: WO2018/131615
PCT Pub. Date: Jul. 19, 2018

(65) Prior Publication Data
US 2019/0381978 A1    Dec. 19, 2019

(30) Foreign Application Priority Data
Jan. 12, 2017 (JP) .............................. JP2017-003607

(51) Int. Cl.
*B60T 8/171* (2006.01)
*B60T 17/22* (2006.01)

(52) U.S. Cl.
CPC ............ *B60T 8/171* (2013.01); *B60T 17/221* (2013.01); *B60T 2270/402* (2013.01); *B60T 2270/413* (2013.01)

(58) Field of Classification Search
CPC .. B60T 8/171; B60T 17/221; B60T 2270/402; B60T 2270/413; B60T 13/745; B60T 7/042; B60T 8/267; G06F 11/0757; G06F 11/0721; G06F 11/0745; G06F 11/3055
See application file for complete search history.

(56) References Cited

U.S. PATENT DOCUMENTS

| | | | |
|---|---|---|---|
| 2007/0188018 A1* | 8/2007 | Reuter | B60T 7/042 303/114.1 |
| 2016/0041862 A1* | 2/2016 | Herz | G06F 13/4282 714/56 |

FOREIGN PATENT DOCUMENTS

JP    2016-144178 A    8/2016

OTHER PUBLICATIONS

International Search Report dated Apr. 17, 2018 in PCT/JP2018/000366 filed on Jan. 10, 2018.

\* cited by examiner

*Primary Examiner* — Anne Marie Antonucci
*Assistant Examiner* — Andrew J Cromer
(74) *Attorney, Agent, or Firm* — Oblon, McClelland, Maier & Neustadt, L.L.P.

(57) ABSTRACT

This vehicle control system is provided with an input monitoring unit and a determination time changing unit. When a state in which first target data is not input to a second control unit continues for a first determination time or longer, the input monitoring unit determines the first target data to be in a non-input state. When a state in which second target data is not input to the second control unit continues for a second determination time or longer, the input monitoring unit determines the second target data to be in a non-input state. When the first target data is determined to be in a non-input state, the determination time changing unit shortens the second determination time.

8 Claims, 6 Drawing Sheets

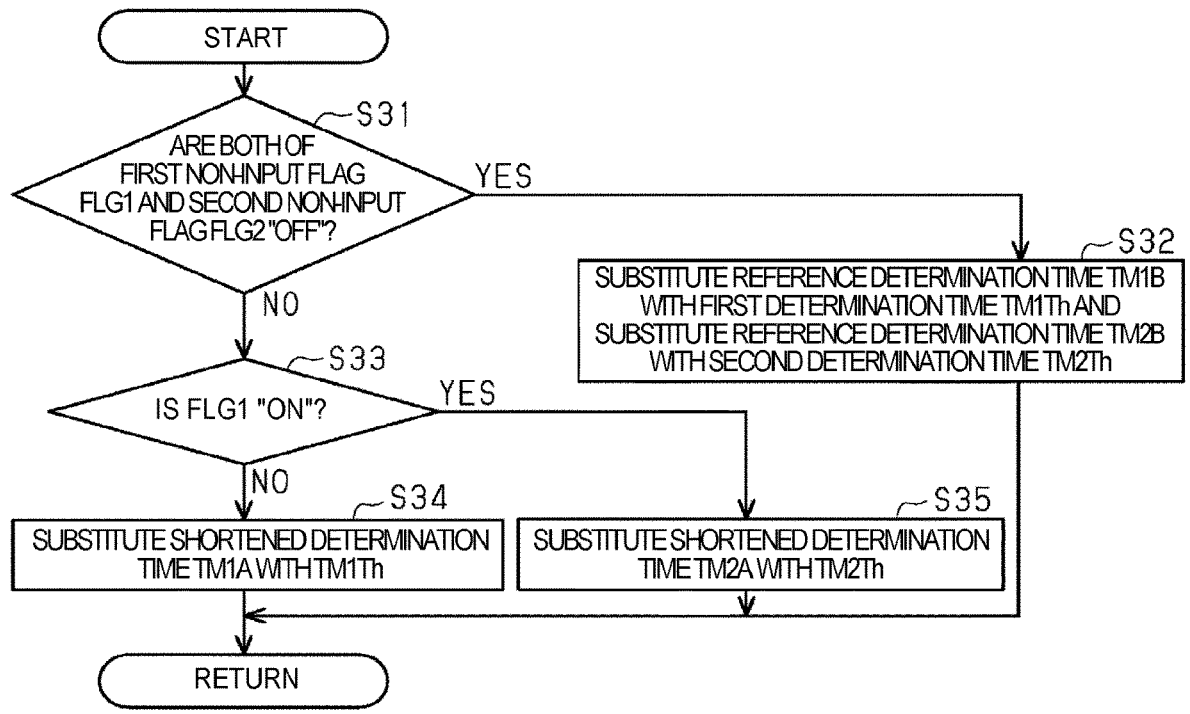
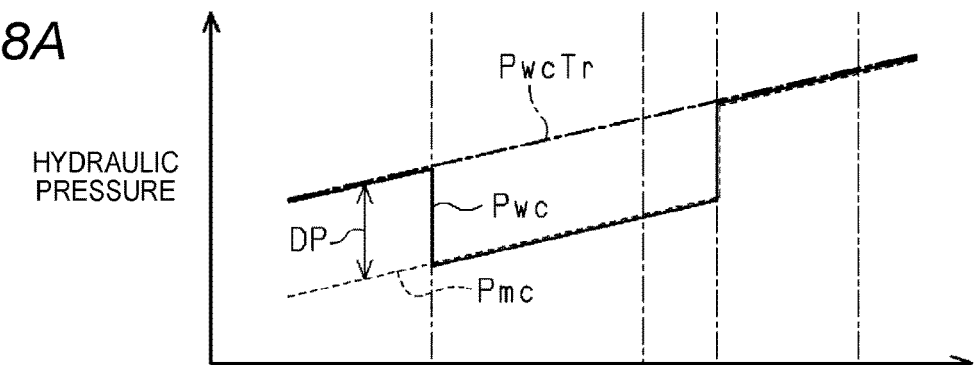
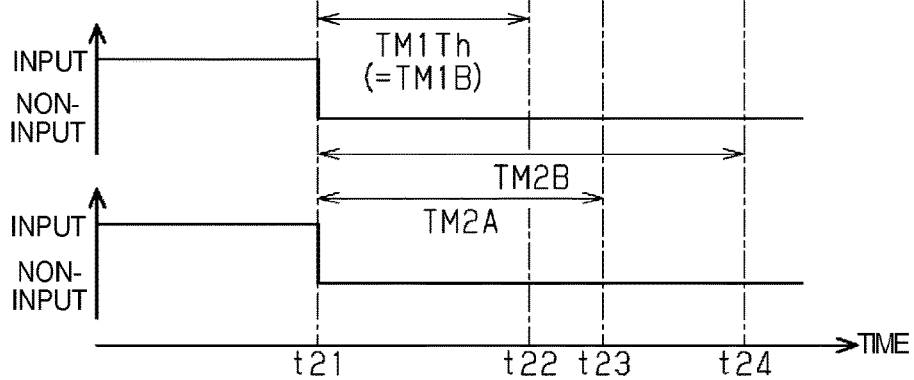

FIG. 9
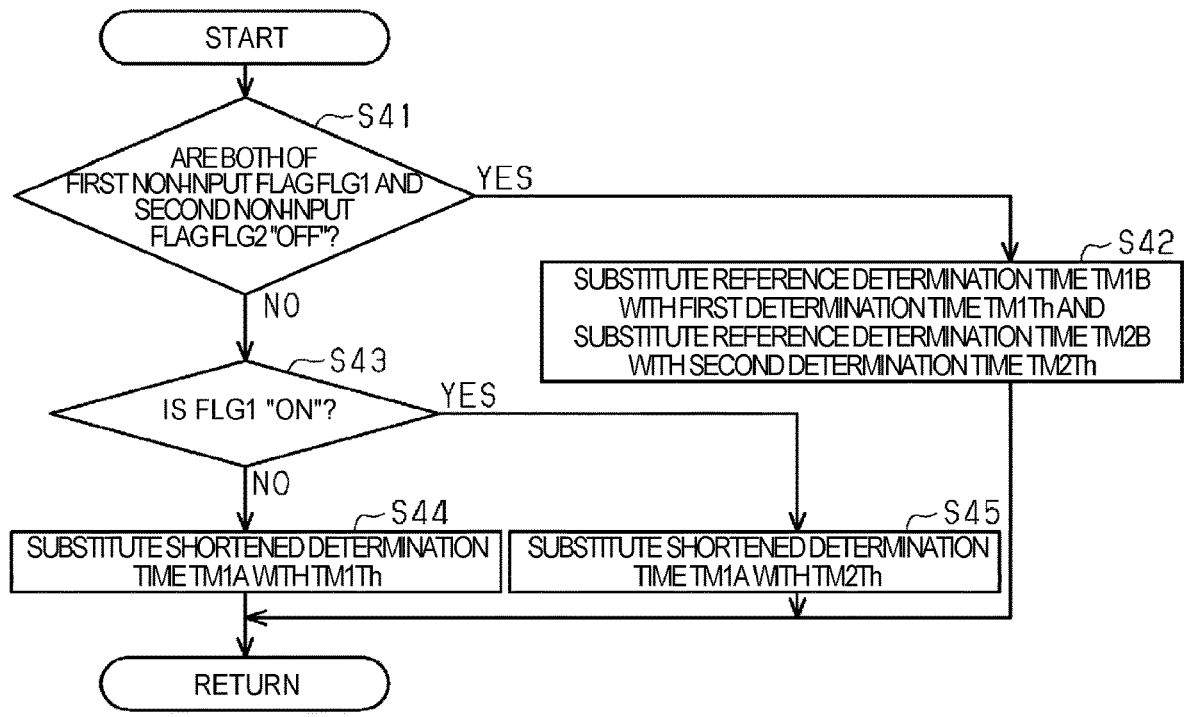
FIG. 10A
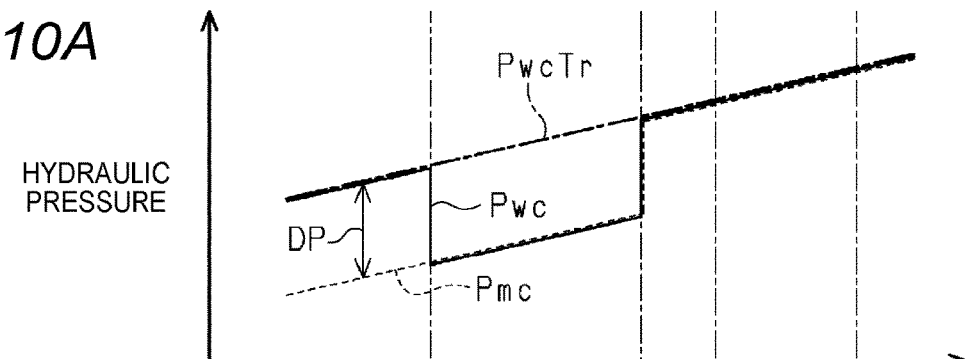
FIG. 10B FIRST TARGET DATA Tr1
FIG. 10C SECOND TARGET DATA Tr2
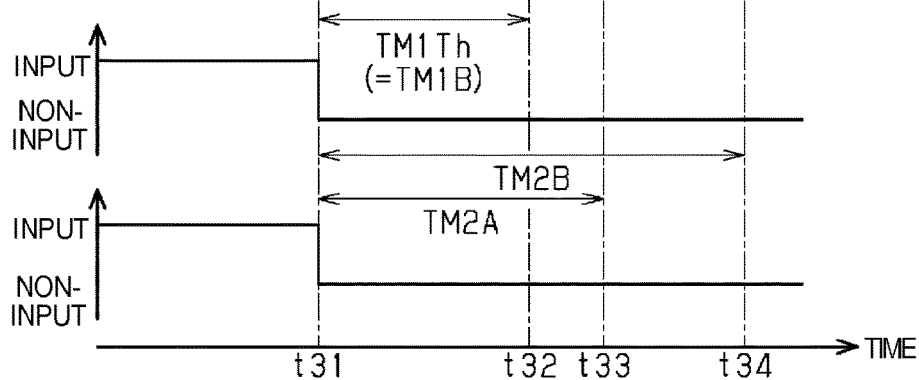

VEHICLE CONTROL SYSTEM

TECHNICAL FIELD

The present invention relates to a vehicle control system which can be applied to a vehicle having a hydraulic pressure control unit for adjusting the hydraulic pressure in a wheel cylinder provided for a wheel, thereby adjusting a braking force on the wheel.

BACKGROUND ART

In some vehicles, hydraulic pressure control units for adjusting the hydraulic pressures in wheel cylinders provided for wheels to adjust the braking forces on the wheels are provided. A control system which can be applied to such a vehicle has a control device for controlling a hydraulic pressure control unit on the basis of target data related to a target value for the hydraulic pressures in the wheel cylinders. In this control system, if inputting of target data to the control device stops, the operation of the hydraulic pressure control unit stops, and the hydraulic pressures in the wheel cylinders, i.e. the braking forces on the wheels may decrease.

For this reason, in this control system, it is preferable to prepare a plurality of communication buses, for example, as disclosed in Patent Literature 1, such that it is possible to input target data to the control device via any communication bus. In this case, even if it becomes impossible to input target data to the control device via one communication bus, it is possible to input target data to the control device via another communication bus.

CITATION LIST

Patent Literature

Patent Literature 1: JP-A-2016-144178

SUMMARY OF INVENTION

Technical Problem

By the way, even in the control system having the plurality of communication buses as described above, if target data cannot been input to the control device via any communication bus, after all, the hydraulic pressures in the wheel cylinders, i.e. the braking force on the wheels may decrease. In the case where the braking force decreases as described above, it is required to perform a backup process of compensating the decrease of the braking force. In a control system for performing a backup process as described above, it is desired to shorten the time lag from when inputting of target data to the control device stops to when the backup process starts.

Solution to Problem

A vehicle control system for solving the problem is a system which is applied to a vehicle having a hydraulic pressure control unit for adjusting the hydraulic pressure in a wheel cylinder provided for a wheel, thereby adjusting a braking force on the wheel. This control system includes a control unit that is a control unit to which first target data related to a target value for the hydraulic pressure in the wheel cylinder is input through a first communication system and second target data related to the target value is input through a second communication system different from the first communication system, and controls the hydraulic pressure control unit on the basis of at least one target data of the first target data and the second target data, and an input monitoring unit that determines whether the first target data is in a non-input state where it is not being input to the control unit, and determines whether the second target data is in a non-input state where it is not being input to the control unit. In this control system according to the preamble, the input monitoring unit determines that the first target data is in the non-input state, if the state where the first target data is not being input to the control unit continues for a first determination time or longer, and determines that the second target data is in the non-input state if the state where the second target data is not being input to the control unit continues for a second determination time or longer. Also, the corresponding control system includes a backup process unit that performs a backup process of restoring the braking force or urging to restore the braking force in order to compensate decrease of the braking force on the wheel attributable to decrease of the hydraulic pressure in the wheel cylinder, if it is determined by the input monitoring unit that the first target data is in the non-input state and it is determined that the second target data is in the non-input state, and a determination time changing unit that performs a time shortening process of shortening the second determination time in the case where it is determined by the input monitoring unit that the first target data is in the non-input state, as compared to the case where it is not determined that the first target data is in the non-input state.

According to this configuration, if it is determined that the first target data is in the non-input state, the second determination time is shortened as compared to the case where it is not determined that the first target data is in the non-input state. For this reason, when it is determined that the first target data is in the non-input state, if it is not determined yet that the second target data is in the non-input state, it is possible to shorten the time required from when it is determined that the first target data is in the non-input state to when it is determined that the second target data is in the non-input state. For this reason, in the case where inputting of every target data to the control unit stops, whereby the braking force on the wheel decreases, it is possible to early start the backup process.

BRIEF DESCRIPTION OF DRAWINGS

FIG. 7 is a flow chart illustrating a process routine which is performed to set each determination time, in the first embodiment.

(a), (b), and (c) of FIG. 8 are timing charts when each target data has not been input to a second control unit.

FIG. 9 is a flow chart for explaining a process routine which is performed to set each determination time, in a second embodiment.

(a), (b), and (c) of FIG. 10 are timing charts when each target data has not been input to the second control unit.

DESCRIPTION OF EMBODIMENTS

Hereinafter, an embodiment of a vehicle control system will be described with reference to FIG. 1 to FIG. 8.

Figure 1:
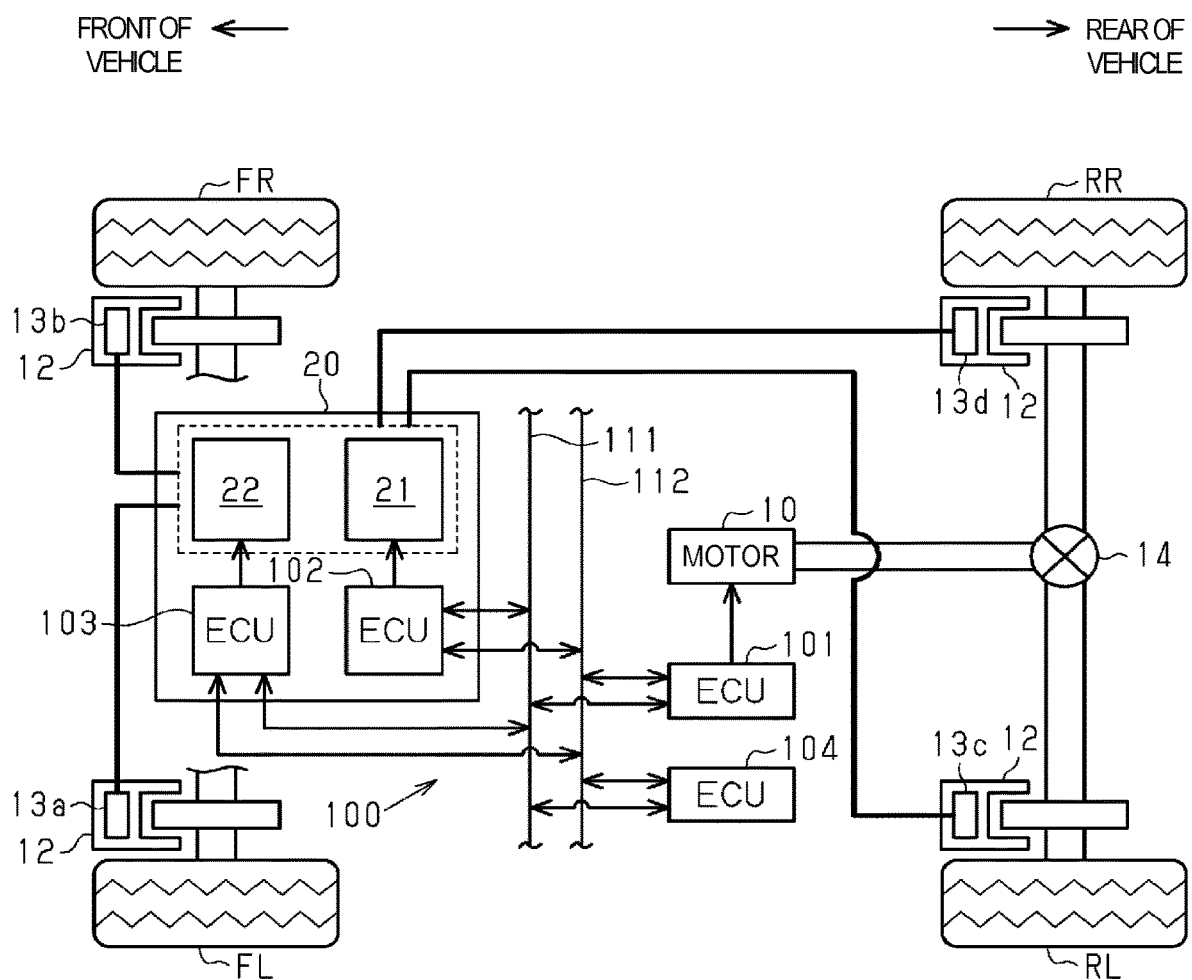
FIG. 1 is a configuration diagram illustrating the outline of a vehicle including a vehicle control system of a first embodiment.

In FIG. 1, a vehicle including a vehicle control system 100 of the present embodiment is schematically shown. As shown in FIG. 1, the vehicle includes a drive motor 10 which is an example of a drive source for the vehicle, and a drive control device 101 for controlling driving of the drive motor 10. The drive control device 101 is one of the components of the control system 100. Also, in the vehicle, braking mechanisms 12 are provided for wheels FL, FR, RL, and RR, respectively. These braking mechanisms 12 have wheel cylinder 13a, 13b, 13c, and 13d, respectively, and can give frictional braking forces BPP according to WC pressures Pwc which are the hydraulic pressures in the wheel cylinders 13a to 13d to the wheels FL, FR, RL, and RR, respectively.

The drive system of the vehicle is rear wheel drive, and the driving force output from the drive motor 10 is transmitted to the rear wheels RL and RR via a differential gear 14. Also, in this vehicle, by controlling the drive motor 10 and an inverter for the drive motor 10, it is possible to give a regenerative braking force BPR to the rear wheels RL and RR.

Figure 2:
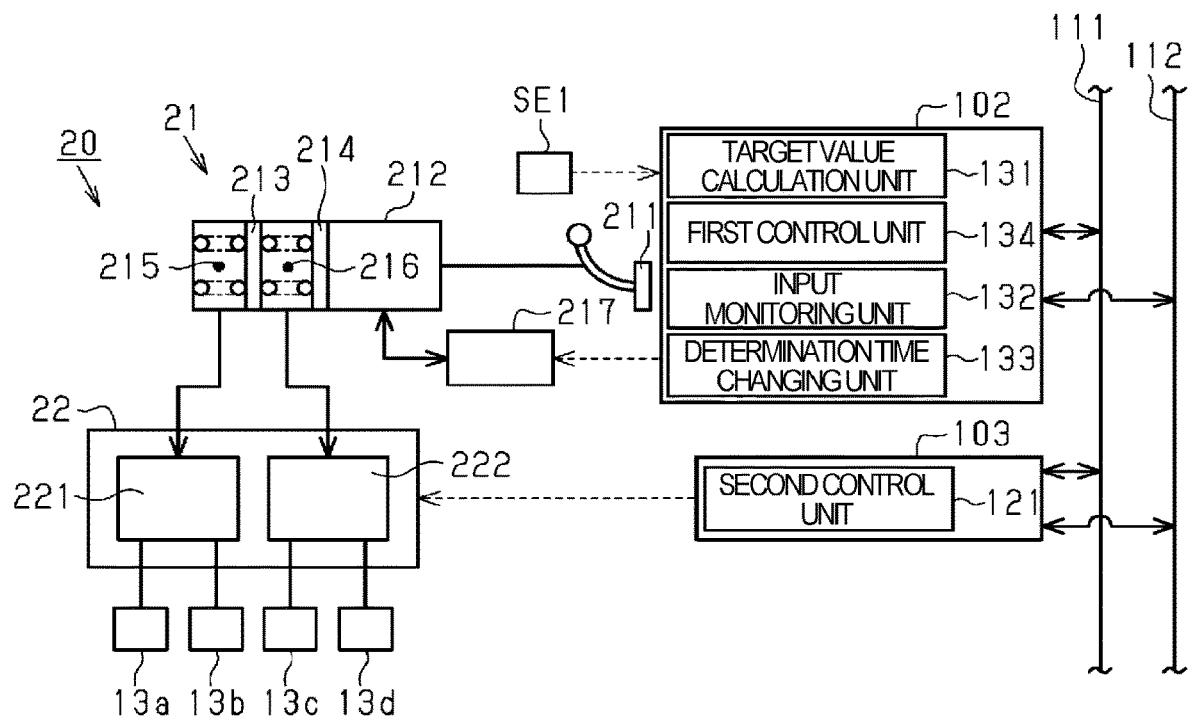
FIG. 2 is a view illustrating the outline of the functional configuration of each braking control device which constitutes the control system, and the configurations of a hydraulic pressure generating device and a braking actuator whose operations are controlled by the control system.

As shown in FIG. 1 and FIG. 2, in the vehicle, a frictional braking device 20 for controlling the frictional braking forces BPP on the wheels FL, FR, RL, and RR by adjusting the WC pressures Pwc in the wheel cylinders 13a to 13d is provided. The frictional braking device 20 includes a hydraulic pressure generating device 21, and a braking actuator 22 provided separately from the hydraulic pressure generating device 21. In the present embodiment, the braking actuator 22 is an example of a "hydraulic pressure control unit". Also, in the frictional braking device 20, a first braking control device 102 for controlling the hydraulic pressure generating device 21, and a second braking control device 103 for controlling the braking actuator 22 are provided. Each of these braking control devices 102 and 103 is one of the components of the vehicle control system 100. Further, by operating the hydraulic pressure generating device 21 by the first braking control device 102, it is possible to adjust the WC pressures Pwc in all wheel cylinders 13a to 13d. Also, by operating the braking actuator 22 by the second braking control device 103, it is possible to separately adjust the WC pressure Pwc in each of the wheel cylinders 13a to 13d.

In other words, as shown in FIG. 2, the hydraulic pressure generating device 21 includes a braking operation member 211 such as a brake pedal, a master cylinder 212, and two master pistons 213 and 214 disposed inside the master cylinder 212. Further, inside the master cylinder 212, two master chambers 215 and 216 are defined by the master pistons 213 and 214. The master chamber 215 is connected to the wheel cylinders 13a and 13b for the front wheels, and the master chamber 216 is connected to the wheel cylinders 13c and 13d for the rear wheels. MC pressures Pmc which are the hydraulic pressures in the master chambers 215 and 216 increase if the master pistons 213 and 214 are displaced to the pressurization side (the left in the drawings), and decrease if the master pistons 213 and 214 are displaced to the depressurization side (the right in the drawings). Also, in the hydraulic pressure generating device 21, an operation unit 217 for operating to displace the master pistons 213 and 214 inside the master cylinder 212 is provided. In other words, in the present embodiment, by adjusting the MC pressures Pmc by the operation of the operation unit 217, it is possible to adjust the WC pressure Pwc in each of the wheel cylinders 13a to 13d. Also, in the hydraulic pressure generating device 21, an operation amount sensor SE1 for detecting the operation amount on the braking operation member 211 is provided, and the output signal from the operation amount sensor SE1 is input to the first braking control device 102.

Also, the braking actuator 22 includes a front wheel system brake unit 221 disposed between the master chamber 215 and the wheel cylinders 13a and 13b for the front wheels, and a rear wheel system brake unit 222 disposed between the master chamber 216 and the wheel cylinders 13c and 13d for the rear wheels. By operating the front wheel system brake unit 221, it is possible to generate a differential pressure between the insides of the wheel cylinders 13a and 13b for the front wheels and the master chamber 215, such that the WC pressure Pwc in the wheel cylinders 13a and 13b for the front wheels becomes higher than the MC pressure Pmc in the master chamber 215. Similarly, by operating the rear wheel system brake unit 222, it is possible to generate a differential pressure between the insides of the wheel cylinders 13c and 13d for the rear wheels and the master chamber 216, such that the WC pressure Pwc in the wheel cylinders 13c and 13d for the rear wheels becomes higher than the MC pressure Pmc in the master chamber 216.

Figure 3:
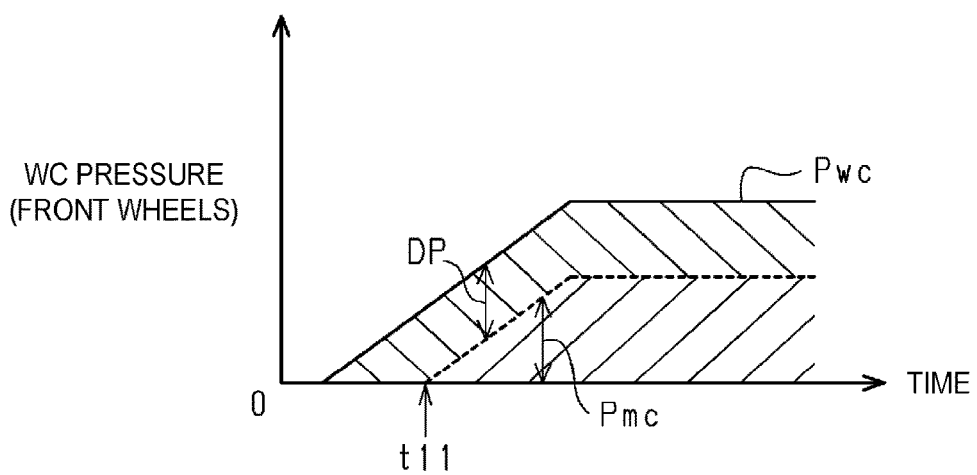
FIG. 3 is a timing chart illustrating examples of the operation start timing of the braking actuator and the operation start timing of the hydraulic pressure generating device for increasing the hydraulic pressure in wheel cylinders.

Now, with reference to FIG. 3, the operations of the hydraulic pressure generating device 21 and the braking actuator 22 for decelerating the vehicle by giving a braking force will be described. Also, in FIG. 3, the transition of the WC pressure Pwc in the wheel cylinders 13a and 13b for the front wheels is shown.

In the above-described vehicle, the drive motor 10 is connected to the rear wheels RL and RR and drives them. For this reason, during braking of the vehicle, the regenerative braking force BPR is given to the rear wheels, but the regenerative braking force BPR is not given to the front wheels FL and FR. Therefore, at the early stage of braking of the vehicle, in order not to decrease the stability of the behavior of the vehicle, as shown in FIG. 3, first, by the operation of the braking actuator 22, the differential pressure DP between the insides of the wheel cylinders 13a and 13b for the front wheels and the master chamber 215 is increased, whereby the WC pressure Pwc in the wheel cylinders 13a and 13b for the front wheels increases. In this case, the braking actuator 22 operates so as not to increase the WC pressure Pwc in the wheel cylinders 13c and 13d for the rear wheels. Further, from a timing t11 when the WC pressure Pwc in the wheel cylinders 13a and 13b for the front wheels has increased to an extent by the operation of the braking actuator 22, the operation of the operation unit 217 of the hydraulic pressure generating device 21 is started. If the operation of the operation unit 217 is started as described above, the braking actuator 22 operates to hold the differential pressure DP between the master chamber 215 and the insides of the wheel cylinders 13a and 13b for the front wheels. Further, if the MC pressure Pmc in each of the master chambers 215 and 216 becomes higher by the operation of the operation unit 217, the WC pressure Pwc in each of the wheel cylinders 13a to 13d increases.

Now, with reference to FIG. 1 and FIG. 2, the vehicle control system 100 will be described.

As shown in FIG. 1, the control system 100 of the present embodiment includes a control device 104 for automatic driving for generally controlling the vehicle to make the vehicle perform automatic driving. Also, in the control system 100, a first communication bus 111 which is an example of a first communication system, and a second communication bus 112 which is an example of a second communication system different from the first communication system are provided. Further, each of the individual control devices 101 to 104 which constitute the control system 100 is electrically connected to the first communication bus 111, and is electrically connected to the second communication bus 112. For this reason, the individual control devices 101 to 104 can perform both of outputting a variety of data to the first communication bus 111 and outputting a variety of data to the second communication bus 112. Also, the individual control devices 101 to 104 can perform both of receiving a variety of data through the first communication bus 111 and receiving a variety of data through the second communication bus 112.

For example, as shown in FIG. 2, in the present embodiment, since the operation amount sensor SE1 is electrically connected to the first braking control device 102, the first braking control device 102 computes a required braking force BPT on the basis of the output signal from the operation amount sensor SE1. Further, in the case of increasing the WC pressures Pwc in the wheel cylinders 13a to 13d by the operation of the braking actuator 22, the first braking control device 102 outputs target data related to target values for the WC pressures Pwc, i.e. differential-pressure target values DPTr which are target values for the differential pressures DP between the master chambers 215 and 216 and the wheel cylinders 13a to 13d. At this time, the first braking control device 102 outputs the target data to both of the first communication bus 111 and the second communication bus 112. For this reason, to the second braking control device 103, the target data is input through the first communication bus 111, and the target data is input through the second communication bus 112. Further, the second braking control device 103 controls the operation of the braking actuator 22 on the basis of the target data input through at least one communication bus of the individual communication buses 111 and 112.

Also, in the case of decelerating the vehicle under the situation where the vehicle is performing automatic driving, the required braking force BPT is calculated by the control device 104 for automatic driving. In this case, the control device 104 for automatic driving calculates the target value for the WC pressure Pwc on the basis of the required braking force BPT, and outputs the target data related to the target value to both of the first communication bus 111 and the second communication bus 112. For this reason, even in the case where the vehicle is performing automatic driving, the second braking control device 103 can control the operation of the braking actuator 22 on the basis of the target data input through at least one communication bus of the individual communication buses 111 and 112.

Now, with reference to FIG. 4 and FIG. 5, the communication method using the two communication buses 111 and 112 will be described.

Figure 4:
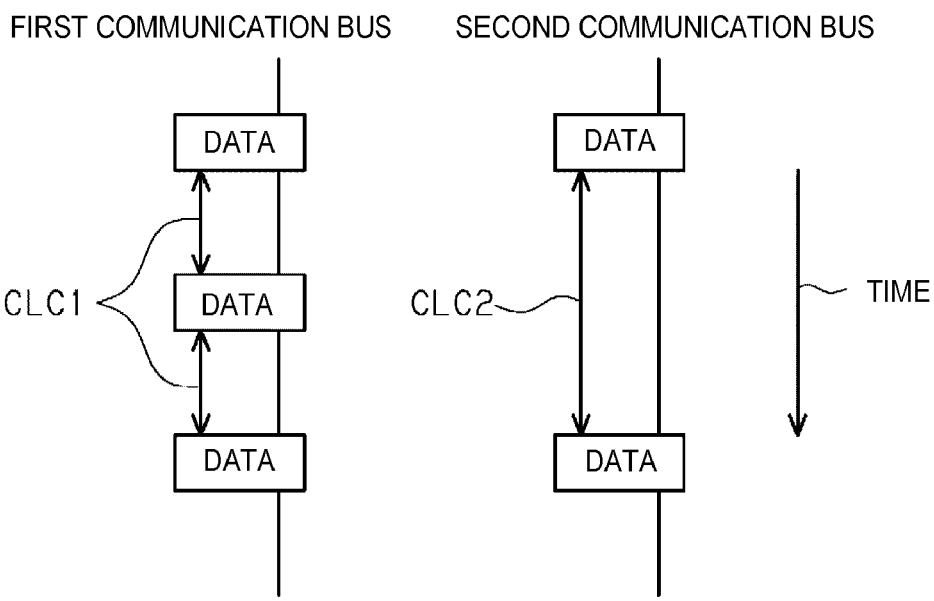
FIG. 4 is a view for explaining a communication method using a first communication bus and a second communication bus.
Figure 5:
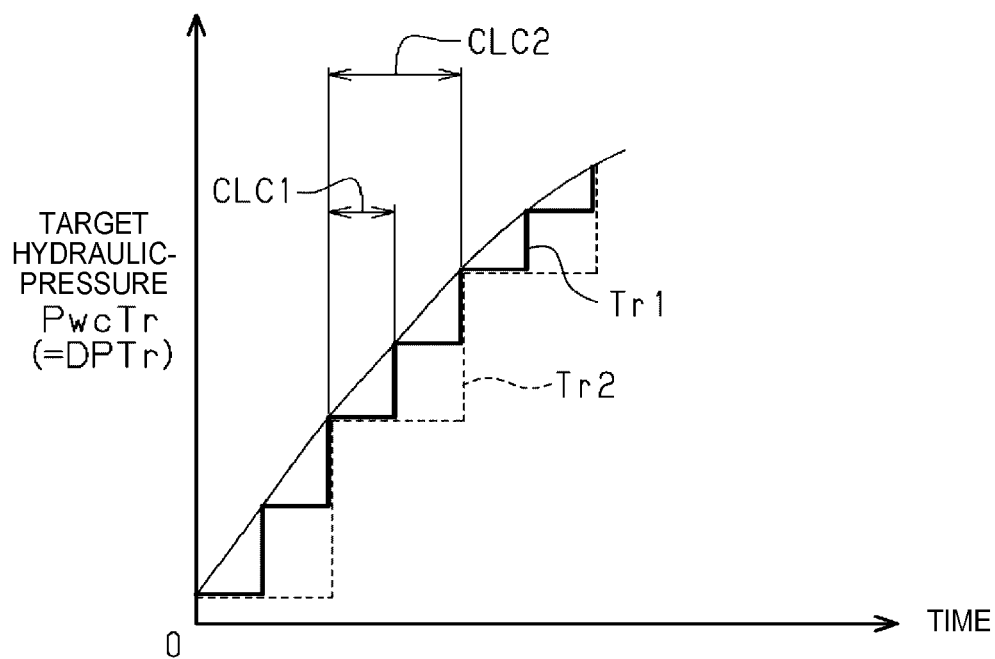
FIG. 5 is a view illustrating transitions of first target data and second target data when target hydraulic-pressure is increasing.

As shown in FIG. 4, to the first communication bus 111, data is input every first cycle CLC1; whereas, to the second communication bus 112, data is input every second cycle CLC2. Target data which the first braking control device 102 or the control device 104 for automatic driving outputs to the first communication bus 111 in order to operate the braking actuator 22 will be referred to as "first target data Tr1", and target data which it outputs to the second communication bus 112 will be referred to as "second target data Tr2". Further, as shown in FIG. 4 and FIG. 5, the temporal length of the second cycle CLC2 is N times the temporal length of the first cycle CLC1 (N is an integer of 2 or greater, for example, 2). By the way, in FIG. 5, the transition of the differential-pressure target value DPTr which is calculated by the first braking control device 102 is shown. In FIG. 5, for facilitating understanding of explanation, the case where the differential-pressure target value DPTr is equal to a target hydraulic-pressure PwcTr which is a target value for the WC pressures Pwc in the wheel cylinders 13a to 13d is shown. Also, in FIG. 5, the transition of the first target data Tr1 which is input to the second braking control device 103 through the first communication bus 111 is shown by a thick solid line, and the transition of the second target data Tr2 which is input to the second braking control device 103 through the second communication bus 112 is shown by a broken line.

However, for example, the information amount of the second target data Tr2 may be the same as that of the first target data Tr1, or may be smaller than the information amount of the first target data Tr1.

Now, with reference to FIG. 2, the functional configurations of the individual braking control devices 102 and 103 will be described.

As shown in FIG. 2, the second braking control device 103 includes a second control unit 121 for controlling the operation of the braking actuator 22 on the basis of at least one data of the first target data Tr1 and the second target data Tr2 input through the communication buses 111 and 112. Specifically, in the case where both of the first target data Tr1 and the second target data Tr2 are being input, and in the case where the first target data Tr1 is being input but the second target data Tr2 is not being input, the second control unit 121 controls the operation of the braking actuator 22 on the basis of the differential-pressure target value DPTr represented by the first target data Tr1. Also, in the case where the second target data Tr2 is being input but the first target data Tr1 is not being input, the second control unit 121 controls the operation of the braking actuator 22 on the basis of the differential-pressure target value DPTr represented by the second target data Tr2. In other words, in the present embodiment, the second control unit 121 acts as an example of a "control unit" for controlling the braking actuator 22 which is an example of the hydraulic pressure control unit.

However, in the case where both of the first target data Tr1 and the second target data Tr2 are not input, the second control unit 121 cannot control the operation of the braking actuator 22. For this reason, under the situation where a differential pressure DP has been generated between the master chambers 215 and 216 and the wheel cylinders 13a to 13d by the operation of the braking actuator 22, if inputting of both of the first target data Tr1 and the second target data Tr2 to the second control unit 121 stops, since the operation of the braking actuator 22 stops, the WC pressure Pwc decreases.

The first braking control device 102 includes a target value calculation unit 131, an input monitoring unit 132, a determination time changing unit 133, and a first control unit 134, as functional units for controlling the frictional braking device 20.

The target value calculation unit 131 calculates a target value for operating the frictional braking device 20. For example, the target value calculation unit 131 obtains a required frictional braking force BPPT by subtracting the sum of the regenerative braking forces BPR which the drive motor 10 is giving to the rear wheels RL and RR from the required braking force BPT based on the output signal from the operation amount sensor SE1. Also, the target value calculation unit 131 calculates the target hydraulic-pressure PwcTr which is the target value for the WC pressures Pwc in the wheel cylinders 13a to 13d, on the basis of the calculated required frictional braking force BPPT. Also, the target value calculation unit 131 calculates a differential-pressure target value DPTr which is a target value for the differential pressures DP between the master chambers 215 and 216 and the wheel cylinders 13a to 13d, and an MC pressure target value PmcTr which is a target value for the MC pressure Pmc in the master chambers 215 and 216, on the basis of the calculated target hydraulic-pressure PwcTr. Further, the target value calculation unit 131 outputs WC pressure target data related to the target hydraulic-pressure PwcTr and the differential-pressure target value DPTr calculated, as the first target data Tr1, to the first communication bus 111, and generates the second target data Tr2 from the WC pressure target data, and outputs the second target data Tr2 to the second communication bus 112. Furthermore, the target value calculation unit 131 outputs the calculated MC pressure target value PmcTr to the first control unit 134.

The input monitoring unit 132 monitors whether the first target data Tr1 is being input to the second braking control device 103 through the first communication bus 111, and monitors whether the second target data Tr2 is being input to the second braking control device 103 through the second communication bus 112. Further, in the case of determining that both data of the first target data Tr1 and the second target data Tr2 are not input to the second braking control device 103, the input monitoring unit 132 outputs an abnormality signal to the first control unit 134.

In the case of changing determination times TM1Th and TM2Th to be used for monitoring of the input monitoring unit 13, the determination time changing unit 133 outputs the changed determination times TM1Th and TM2Th to the input monitoring unit 132. The determination times TM1Th and TM2Th will be further described below.

The first control unit 134 controls the operation of the hydraulic pressure generating device 21 on the basis of the MC pressure target value PmcTr input from the target value calculation unit 131. Also, if the abnormality signal is input from the input monitoring unit 132, the first control unit 134 performs a backup process of restoring the braking force by the operation of the hydraulic pressure generating device 21 in order to compensate the decrease of the WC pressure Pwc attributable to the stop of the operation of the braking actuator 22, i.e. the decrease of the braking force on the wheels FL, FR, RL, and RR. In this case, in the backup process, the first control unit 134 controls the operation of the hydraulic pressure generating device 21 on the basis of the target hydraulic-pressure PwcTr, not on the basis of the MC pressure target value PmcTr.

Now, with reference to FIG. 6, a process routine which the input monitoring unit 132 performs in order to determine whether the first target data Tr1 is being input to the second braking control device 103 and determine whether the second target data Tr2 is being input to the second braking control device 103 will be described. Also, this process routine is performed every preset control cycle.

Figure 6:
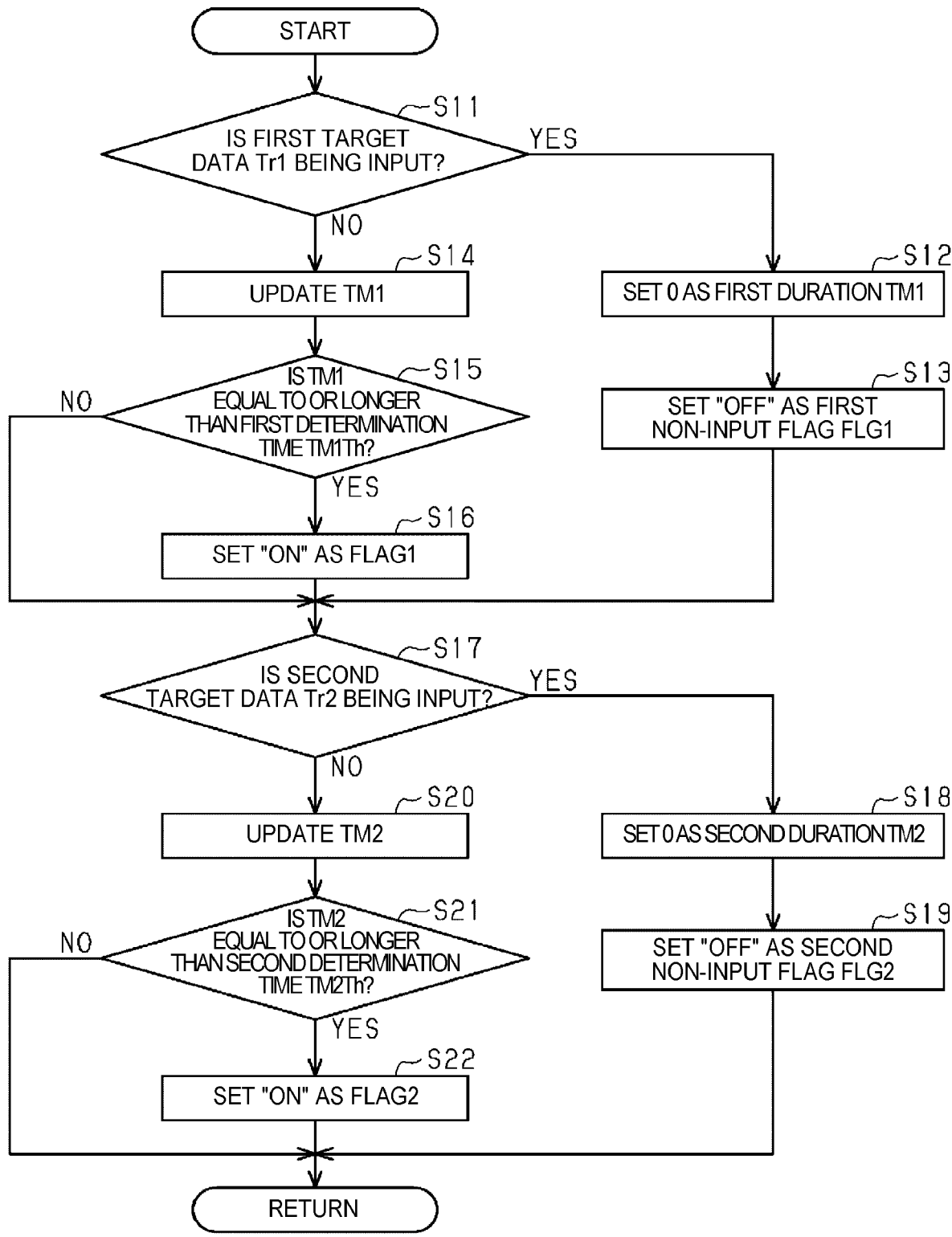
FIG. 6 is a flow chart for explaining a process routine which is performed to determine whether the first target data is in a non-input state and determine whether second target data is in a non-input state, in the first embodiment.

As shown in FIG. 6, in the present process routine, the input monitoring unit 132 determines whether the first target data Tr1 is being input to the second braking control device 103 through the first communication bus 111 (STEP S11). In the case of determining that the first target data Tr1 is being input to the second braking control device 103 (YES in STEP S11), the input monitoring unit 132 resets a first duration TM1 to "0" (STEP S12). The first duration TM1 is the duration of the state where the first target data Tr1 is not being input to the second braking control device 103. In other words, the first duration TM1 can also be referred to as the elapsed time from the time point when it is detected that the first target data Tr1 is not being input to the second braking control device 103. Subsequently, the input monitoring unit 132 sets "OFF" in a first non-input flag FLG1 to be described below (STEP S13), and then advances the process to STEP S17 to be described below.

Meanwhile, in the case where it is not determined in STEP S11 that the first target data Tr1 is being input to the second braking control device 103 (NO), the input monitoring unit 132 updates the first duration TM1 (STEP S14). Subsequently, the input monitoring unit 132 determines whether the updated first duration TM1 is equal to or longer than a first determination time TM1Th (STEP S15). The first determination time TM1Th is a determination value for determining whether to determine that the first target data Tr1 is in the non-input state where it is not being input to the second braking control device 103. For this reason, in the case where the first duration TM1 is equal to or longer than the first determination time TM1Th, it is possible to determine that the first target data Tr1 is in the non-input state; however, in the case where the first duration TM1 is shorter than the first determination time TM1Th, it is impossible to determine that the first target data Tr1 is in the non-input state.

By the way, in the case where the first determination time TM1Th has not been shortened by the determination time changing unit 133, the first determination time TM1Th becomes equal to the time corresponding to M-number of first cycles CLC1 (M is an integer of 2 or greater, for example, 4). For this reason, when the first target data Tr1 has not consecutively been input to the second braking control device 103 M-number of times, the first duration TM1 becomes equal to or longer than the first determination time TM1Th, so it is possible to determine that the first target data Tr1 is in the non-input state.

Further, in the case where the first duration TM1 is equal to or longer than the first determination time TM1Th (YES in STEP S15), the input monitoring unit 132 sets "ON" in the first non-input flag FLG1 (STEP S16), and advances the process to the next STEP S17. In other words, the first non-input flag FLG1 is a flag which is set to "ON" if it is possible to determine that the first target data Tr1 is in the non-input state, and is set to "OFF" if it is not possible to determine that the first target data Tr1 is in the non-input state. Meanwhile, in the case where the first duration TM1 is shorter than the first determination time TM1Th (NO in STEP S15), the input monitoring unit 132 advances the process to the next STEP S17, without performing the process of STEP S16.

In STEP S17, the input monitoring unit 132 determines whether the second target data Tr2 is being input to the second braking control device 103 through the second communication bus 112. In the case of determining that the second target data Tr2 is being input to the second braking control device 103 (YES in STEP S17), the input monitoring unit 132 resets a second duration TM2 to "0" (STEP S18). The second duration TM2 is the duration of the state where the second target data Tr2 is not being input to the second braking control device 103. Subsequently, the input monitoring unit 132 sets "OFF" in a second non-input flag FLG2 to be described below (STEP S19), and then temporarily ends the present process routine.

Meanwhile, in the case where it is not determined in STEP S17 that the second target data Tr2 is being input to the second braking control device 103 (NO), the input monitoring unit 132 updates the second duration TM2 (STEP S20). Subsequently, the input monitoring unit 132 determines whether the second duration TM2 is equal to or longer than a second determination time TM2Th (STEP S21). The second determination time TM2Th is a determination value for determining whether to determine that the second target data Tr2 is in the non-input state where it is not being input to the second braking control device 103. For this reason, in the case where the second duration TM2 is equal to or longer than the second determination time TM2Th, it is possible to determine that the second target data Tr2 is in the non-input state; whereas, in the case where the second duration TM2 is shorter than the second determination time TM2Th, it is impossible to determine that the second target data Tr2 is in the non-input state.

By the way, in the case where the second determination time TM2Th has not been shortened by the determination time changing unit 133, the second determination time TM2Th becomes equal to the time corresponding to M-number of second cycles CLC2 (M is an integer of 2 or greater, for example, 4). For this reason, when the second target data Tr2 has not consecutively been input to the second braking control device 103 M-number of times, the second duration TM2 becomes equal to or longer than the second determination time TM2Th, so it is possible to determine that the second target data Tr2 is in the non-input state.

Further, in the case where the second duration TM2 is equal to or longer than the second determination time TM2Th (YES in STEP S21), the input monitoring unit 132 sets "ON" in the second non-input flag FLG2 (STEP S22), and temporarily ends the present process routine. In other words, the second non-input flag FLG2 is a flag which is set to "ON" if it is possible to determine that the second target data Tr2 is in the non-input state, and is set to "OFF" if it is not possible to determine that the second target data Tr2 is in the non-input state. Meanwhile, in the case where the second duration TM2 is shorter than the second determination time TM2Th (NO in STEP S21), the input monitoring unit 132 temporarily ends the present process routine, without performing the process of STEP S22.

Further, in the case where "ON" has been set in both of the first non-input flag FLG1 and the second non-input flag FLG2, the input monitoring unit 132 outputs the abnormality signal to the first control unit 134.

Now, with reference to FIG. 7, a process routine which the determination time changing unit 133 performs in order to change the determination times TM1Th and TM2Th will be described. Also, the present process routine is performed every preset control cycle.

As shown in FIG. 7, in the present process routine, the determination time changing unit 133 determines whether "OFF" has been set in both of the first non-input flag FLG1 and the second non-input flag FLG2 (STEP S31). In the case where "OFF" has been set in both of the first non-input flag FLG1 and the second non-input flag FLG2 (YES in STEP S31), the determination time changing unit 133 substitutes the first determination time TM1Th with a reference determination time TM1B, and substitutes the second determination time TM2Th with a reference determination time TM2B (STEP S32). The reference determination time TM1B is the first determination time TM1Th when it is not determined that the first target data Tr1 is in the non-input state, and is equal to the time corresponding to M-number of first cycles CLC1. Also, the reference determination time TM2B is the second determination time TM2Th when it is not determined that the second target data Tr2 is in the non-input state, and is equal to the time corresponding to M-number of second cycles CLC2. Thereafter, the determination time changing unit 133 temporarily ends the present process routine.

Meanwhile, in the case where it is determined in STEP S31 that "ON" has been set in at least one flag of both non-input flags FLG1 and FLG2 (NO), the determination time changing unit 133 determines whether "ON" has been set in the first non-input flag FLG1 (STEP S33). In the case where "OFF" has been set in the first non-input flag FLG1, it is possible to determine that "ON" has been set in the second non-input flag FLG2. For this reason, in the case where "OFF" has been set in the first non-input flag FLG1 (NO in STEP S33), the determination time changing unit 133 substitutes the first determination time TM1Th with a shortened determination time TM1A shorter than the reference determination time TM1B (STEP S34). This shortened determination time TM1A is equal to, for example, the time corresponding to L-number of first cycles CLC1 (L is an integer equal to or greater than 1 and smaller than M, for example, 2). Thereafter, the determination time changing unit 133 temporarily ends the present process routine.

Meanwhile, in the case where "ON" has been set in the first non-input flag FLG1 (YES in STEP S33), the determination time changing unit 133 substitutes the second determination time TM2Th with a shortened determination time TM2A shorter than the reference determination time TM2B (STEP S35). This shortened determination time TM2A is equal to, for example, the time corresponding to L-number of second cycles CLC2. Thereafter, the determination time changing unit 133 temporarily ends the present process routine.

Now, with reference to FIG. 8, the action in the case of increasing the WC pressures Pwc in the wheel cylinders 13a to 13d and giving the frictional braking forces BPP to the wheels FL, FR, RL, and RR will be described with the effects. Also, in (a) of FIG. 8, an alternate long and short dash line indicates the transition of the target hydraulic-pressure PwcTr which is the target value for the WC pressures Pwc, and a solid line indicates the transition of the actual WC pressure Pwc, and a broken line indicates the transition of the MC pressure Pmc in the master chamber 215 or 216. Also, in the example shown in FIG. 8, for facilitating understanding of explanation, it is assumed that the regenerative braking force BPR is not being given to the vehicle.

As shown in (a), (b), and (c) of FIG. 8, before a first timing t21 comes, both of the first target data Tr1 and the second target data Tr2 are input to the second braking control device 103. For this reason, by control of the second braking control device 103 on the operation of the braking actuator 22, the differential pressures DP between the wheel cylinders 13a to 13d and the master chambers 215 and 216 are adjusted so as to approach the differential-pressure target value DPTr based on the first target data Tr1. However, at the first timing t21 when it is under the situation where the differential pressures DP are being generated between the wheel cylinders 13a to 13d and the master chambers 215 and 216 by the operation of the braking actuator 22 as described above, inputting of both of the first target data Tr1 and the second target data Tr2 to the second braking control device 103 stops.

Then, since it becomes impossible for the second braking control device 103 to operate the braking actuator 22, i.e. the operation of the braking actuator 22 stops, the above-mentioned differential pressure DP decreases. In the example shown in FIG. 8, the differential pressure DP becomes equal to "0".

Also, at the first timing t21, since "OFF" has been set in both of the first non-input flag FLG1 and the second non-input flag FLG2, it is not determined that the first target data Tr1 is in the non-input state, and it is not determined that the second target data Tr2 is in the non-input state. For this reason, the first determination time TM1Th is equal to the reference determination time TM1B, and the second determination time TM2Th is equal to the reference determination time TM2B.

Further, if the state where both of the first target data Tr1 and the second target data Tr2 are not being input to the second braking control device 103 continues as described above, at a second timing t22, the first duration TM1 which is the duration of the state where the first target data Tr1 is not being input to the second braking control device 103 reaches the first determination time TM1Th (=TM1B). In other words, at the second timing t22, it is determined that the first target data Tr1 is in the non-input state.

In the example shown in FIG. 8, the state where the second target data Tr2 is not being input to the second braking control device 103 has continued from the first timing t21. For this reason, at the second timing t22 when it is determined that the first target data Tr1 is in the non-input state, the second determination time TM2Th is shortened from the reference determination time TM2B to the shortened determination time TM2A.

The timing when the elapsed time from the first timing t21 when the second target data Tr2 was not input to the second braking control device 103 reaches the reference determination time TM2B is referred to as a fourth timing t24. In this case, at a third timing t23 before the fourth timing t24, the second duration TM2 which is the elapsed time from the first timing t21 reaches the second determination time TM2Th (=TM2A), and it is determined that the second target data Tr2 is in the non-input state. In other words, in the example shown in FIG. 8, since it is determined at the third timing t23 that the second target data Tr2 is in the non-input state, at the timing earlier than the fourth timing t24, the backup process is started. Then, by the operation of the hydraulic pressure generating device 21 according to the backup process, the MC pressure Pmc in each of the master chambers 215 and 216 increases. According to the increase of the MC pressure Pmc, the WC pressure Pwc in each of the wheel cylinders 13a to 13d increases. Therefore, in the case where the WC pressure Pwc, i.e. the braking force on the wheels FL, FR, RL, and RR decreases by stop of the operation of the braking actuator 22, it is possible to early restore the braking force by early starting the backup process.

Second Embodiment

Now, a second embodiment of the vehicle control system will be described with reference to FIG. 9 and FIG. 10. In the second embodiment, the data communication method using the second communication bus 112, the method of changing the second determination time TM2Th in the case of determining that the first target data Tr1 has become the non-input state, and so on are different from the first embodiment. Therefore, in the following description, the parts different from the first embodiment will be mainly described, and components identical or corresponding to those of the first embodiment are denoted by the same reference symbols, and a repetitive description will not be made.

In the present embodiment, to the second communication bus 112, the second target data Tr2 is output from the first braking control device 102 or the control device 104 for automatic driving every second cycle CLC2. However, to the second braking control device 103, data different from the second target data Tr2 also is input through the second communication bus 112. Further, in such different data, there is also data which is input to the second braking control device 103 every first cycle CLC1 shorter than the second cycle CLC2. Such data will be referred to as "first different data".

With reference to FIG. 9, a process routine which the determination time changing unit 133 performs in order to change the determination times TM1Th and TM2Th will be described. Also, the present process routine is performed every preset control cycle.

As shown in FIG. 9, in the present process routine, the determination time changing unit 133 determines whether "OFF" has been set in both of the first non-input flag FLG1 and the second non-input flag FLG2 (STEP S41). In the case where "OFF" has been set in both non-input flags FLG1 and FLG2 (YES in STEP S41), the determination time changing unit 133 substitutes the first determination time TM1Th with a reference determination time TM1B, and substitutes the second determination time TM2Th with a reference determination time TM2B (STEP S42). Thereafter, the determination time changing unit 133 temporarily ends the present process routine.

Meanwhile, in the case where it is determined in STEP S41 that "ON" has been set in at least one flag of both non-input flags FLG1 and FLG2 (NO), the determination time changing unit 133 determines whether "ON" has been set in the first non-input flag FLG1 (STEP S43). In the case where "OFF" has been set in the first non-input flag FLG1 (NO in STEP S43), the determination time changing unit 133 substitutes the first determination time TM1Th with the shortened determination time TM1A (STEP S44), and then temporarily ends the present process routine. Meanwhile, in the case where "ON" has been set in the first non-input flag FLG1 (YES in STEP S43), the determination time changing unit 133 substitutes the second determination time TM2Th with the shortened determination time TM1A shorter than the reference determination time TM2B (STEP S45). Thereafter, the determination time changing unit 133 temporarily ends the present process routine.

Now, with reference to FIG. 10, the action in the case of increasing the WC pressures Pwc in the wheel cylinders 13a to 13d and giving the frictional braking forces BPP to the wheels FL, FR, RL, and RR will be described with the effects. Also, in (a) of FIG. 10, an alternate long and short dash line indicates the transition of the target hydraulic-pressure PwcTr which is the target value for the WC pressures Pwc, and a solid line indicates the transition of the actual WC pressure Pwc, and a broken line indicates the transition of the MC pressure Pmc in the master chamber 215 or 216.

As shown in (a), (b), and (c) of FIG. 10, at a first timing t31 when it is under the situation where the differential pressures DP are being generated between the wheel cylinders 13a to 13d and the master chambers 215 and 216 by the operation of the braking actuator 22, inputting of both of the first target data Tr1 and the second target data Tr2 to the second braking control device 103 stops. Then, since the operation of the braking actuator 22 stops, the above-mentioned differential pressures DP decrease.

Also, at the first timing t31, since "OFF" has been set in both of the first non-input flag FLG1 and the second non-input flag FLG2, it is not determined that the first target data Tr1 is in the non-input state, and it is not determined that the second target data Tr2 is in the non-input state. For this reason, the first determination time TM1Th is equal to the reference determination time TM1B, and the second determination time TM2Th is equal to the reference determination time TM2B.

Further, if the state where both of the first target data Tr1 and the second target data Tr2 are not being input to the second braking control device 103 continues as described above, at a second timing t32, the first duration TM1 which is the duration of the state where the first target data Tr1 is not being input to the second braking control device 103 reaches the first determination time TM1Th (=TM1B). In other words, at the second timing t32, it is determined that the first target data Tr1 is in the non-input state. Then, in the present embodiment, the second determination time TM2Th is changed from the reference determination time TM2B to the shortened determination time TM1A.

In the example shown in FIG. 10, at the second timing t32, the second duration TM2 becomes equal to or longer than the second determination time TM2Th (=TM1A). For this reason, at the second timing t32, it is determined that the second target data Tr2 is in the non-input state. Therefore, it is possible to start the backup process at a timing earlier than a fourth timing t34 when the elapsed time from the first timing t31 reaches the reference determination time TM2B and a timing earlier than a third timing t33 when the elapsed time reaches the shortened determination time TM2A.

However, in the case where the second target data Tr2 is not being input to the second braking control device 103 through the second communication bus 112 as described above, there is a possibility that the first different data also is not being input to the second braking control device 103 from the second communication bus 112. For this reason, it can be said that in the present embodiment, in the case where the first different data is not consecutively input to the second braking control device 103 L-number of times, it is determined that the second target data Tr2 is in the non-input state.

However, each embodiment described above may be modified into the following other embodiments.

In each embodiment, in the case where inputting of the first target data Tr1 to the second braking control device 103 stops, and thereafter, inputting of the second target data Tr2 to the second braking control device 103 also stops, from the time point when inputting of the second target data Tr2 to the second braking control device 103 stops, time measurement is performed. However, in this case, time measurement may start from the time point when inputting of the first target data Tr1 to the second braking control device 103 stops, and if the measurement time which is the time which is measured reaches the second determination time TM2Th, it may be determined that the second target data Tr2 is in the non-input state. In this case, since the timing when the measurement time reaches the second determination time TM2Th is earlier than the timing when the second duration TM2 reaches the second determination time TM2Th, it becomes possible to early start the backup process. However, in the case where it is detected that the second target data Tr2 is being input to the second braking control device 103, before the measurement time reaches the second determination time TM2Th, the measurement time is reset to "0".

The length of the second cycle CLC2 may be equal to the length of the first cycle CLC1. In this case, the reference determination time TM2B may be set to be equal to the reference determination time TM1B.

The length of the second cycle CLC2 may be set to be longer than the length of the first cycle CLC1. In this case, the reference determination time TM2B may be set to be equal to the reference determination time TM1B, or may be set to be longer than the reference determination time TM1B.

In each embodiment described above, the shortened determination times TM1A and TM2A are fixed to predetermined values; however, the shortened determination times TM1A and TM2A may be changed according to parameters. As the differential pressure DP attributable to the operation of the braking actuator 22 increases, the decrease amount of the WC pressure Pwc attributable to stop of the operation of the braking actuator 22 increases. As the decrease amount of the WC pressure Pwc increases as described above, it is more required to restore the WC pressure Pwc, and it is desired to early restore the WC pressure Pwc. For this reason, the shortened determination time TM1A may be calculated using the following relational expression (Expression 1), and the shortened determination time TM2A may be calculated using a relational expression (Expression 2). In the relational expressions (Expression 1) and (Expression 2), is a determination time shortening amount, and it is preferable to increase the shortening amount Y as the differential pressure DP attributable to the operation of the braking actuator 22 increases.

$$TM1A = TM1B - Y \quad \text{(Expression 1)}$$

$$TM2A = TM2B - Y \quad \text{(Expression 2)}$$

According to this configuration, in the case of determining that the first target data Tr1 is in the non-input state, it is possible to significantly shorten the second determination time TM2Th as the decrease amount of the WC pressure Pwc attributable to stop of the operation of the braking actuator 22 increases. Also, in the case of determining that the second target data Tr2 is in the non-input state, it is possible to significantly shorten the first determination time TM1Th as the decrease amount of the WC pressure Pwc attributable to stop of the operation of the braking actuator 22 increases. As a result, it is possible to earlier perform the backup process as the decrease amount of the WC pressure Pwc attributable to stop of the operation of the braking actuator 22 increases.

By the way, if it is considered to early perform the backup process, it is preferable to set the determination times TM1Th and TM2Th to be very short, regardless of whether the decrease amount of the WC pressure Pwc attributable to stop of the operation of the braking actuator 22 is large or small. However, as the determination times TM1Th and TM2Th shorten, the accuracy of determination on whether each of the target data Tr1 and Tr2 is in the non-input state decreases. For this reason, in the case where the decrease amount of the WC pressure Pwc attributable to stop of the operation of the braking actuator 22 is small, and the necessity of early performing the backup process is low, the shortening amount Y is set to be small, and the determination times TM1Th and TM2Th are set not to be too short.

According to this, it is possible to implement early performance of the backup process while suppressing decrease of the accuracy of determination on whether the target data is in the non-input state.

In each embodiment described above, another control device (for example, the control device 104 for automatic driving) different from the first braking control device 102 and the second braking control device 103 may be configured to include the input monitoring unit 132 and the determination time changing unit 133.

In the vehicle, a brake device capable of increasing the braking force on the wheels FL, FR, RL, and RR without increasing the WC pressures Pwc in the wheel cylinders 13a to 13d may be provided separately from the frictional braking device 20. In this vehicle control system, another brake device provided separately from the frictional braking device 20 may be operated to perform the backup process of restoring the braking force. Also, in the case where the vehicle can give the regenerative braking force to at least one wheel, as an example of another brake device, a regenerative braking device capable of giving a regenerative braking force to the wheels can be taken. Also, in the case where the vehicle includes an electric parking device, as an example of another brake device, the electric parking device can be taken.

The backup process may be a process including a notifying process of requesting the driver of the vehicle to increase the braking operation amount in order to urge the driver of the vehicle to restore the braking force on the wheels FL, FR, RL, and RR.

Now, a technical idea which can be grasped from the above-described embodiments and other embodiments will be additionally written below.

(A) It is preferable that the determination time changing unit should perform a time shortening process of shortening the first determination time in the case where it is determined by the input monitoring unit that the second target data is in the non-input state, as compared to the case where it is not determined that the second target data is in the non-input state.

The invention claimed is:

1. A vehicle control system which is applied to a vehicle having a hydraulic pressure control unit for adjusting the hydraulic pressure in a wheel cylinder provided for a wheel, thereby adjusting a braking force on the wheel, comprising:
    a control unit to which first target data related to a target value for the hydraulic pressure in the wheel cylinder is input through a first communication system and second target data related to the target value is input through a second communication system different from the first communication system, and controls the hydraulic pressure control unit on the basis of at least one target data of the first target data and the second target data;
    an input monitoring unit that determines whether the first target data is in a non-input state where it is not being input to the control unit, and determines whether the second target data is in a non-input state where it is not being input to the control unit, the input monitoring unit determines that the first target data is in the non-input state, if the state where the first target data is not being input to the control unit continues for a first determination time or longer, and determines that the second target data is in the non-input state if the state where the second target data is not being input to the control unit continues for a second determination time or longer;
    a backup process unit that performs a backup process of restoring the braking force or urging to restore the braking force in order to compensate decrease of the braking force on the wheel attributable to decrease of the hydraulic pressure in the wheel cylinder, if it is determined by the input monitoring unit that the first target data is in the non-input state and it is determined that the second target data is in the non-input state; and
    a determination time changing unit that performs a time shortening process of shortening the second determination time in the case where it is determined by the input monitoring unit that the first target data is in the non-input state, as compared to the case where it is not determined that the first target data is in the non-input state.

2. The vehicle control system according to claim 1, wherein:
    to the control unit, the first target data is input through the first communication system every first cycle, and the second target data is input through the second communication system every second cycle, and
    the second determination time is longer than the first determination time.

3. The vehicle control system according to claim 2, wherein:
    the input monitoring unit determines that the second target data is in the non-input state, if the state where the second target data is not being input to the control unit continues for the second determination time or longer from when it is detected that the first target data is not being input to the control unit.

4. The vehicle control system according to claim 3, wherein:
    the determination time changing unit increases the shortening amount of the second determination time as the increase amount of the hydraulic pressure in the wheel cylinder attributable to control of the control unit based on at least one target data of the first target data and the second target data, in the time shortening process.

5. The vehicle control system according to claim 2, wherein:
    the determination time changing unit increases the shortening amount of the second determination time as the increase amount of the hydraulic pressure in the wheel cylinder attributable to control of the control unit based on at least one target data of the first target data and the second target data, in the time shortening process.

6. The vehicle control system according to claim 1, wherein:
    the input monitoring unit determines that the second target data is in the non-input state, if the state where the second target data is not being input to the control unit continues for the second determination time or longer from when it is detected that the first target data is not being input to the control unit.

7. The vehicle control system according to claim 6, wherein:
    the determination time changing unit increases the shortening amount of the second determination time as the increase amount of the hydraulic pressure in the wheel cylinder attributable to control of the control unit based on at least one target data of the first target data and the second target data, in the time shortening process.

8. The vehicle control system according to claim 1, wherein:
    the determination time changing unit increases the shortening amount of the second determination time as the increase amount of the hydraulic pressure in the wheel cylinder attributable to control of the control unit based on at least one target data of the first target data and the second target data, in the time shortening process.

* * * * *